(12) United States Patent
Van Grunsven et al.

(10) Patent No.: US 10,107,489 B2
(45) Date of Patent: Oct. 23, 2018

(54) PARTICULATE WATER-ACTIVATABLE LUMINESCENT MATERIALS

(71) Applicant: PHILIPS LIGHTING HOLDING B.V., Eindhoven (NL)

(72) Inventors: Eric Cornelis Egbertus Van Grunsven, Eindhoven (NL); Marc Andre De Samber, Eindhoven (NL); Egbertus Reinier Jacobs, Eindhoven (NL); Esther Anna Wilhelmina Gerarda Janssen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 7 days.

(21) Appl. No.: 15/509,100

(22) PCT Filed: Aug. 28, 2015

(86) PCT No.: PCT/EP2015/069779
§ 371 (c)(1),
(2) Date: Mar. 6, 2017

(87) PCT Pub. No.: WO2016/037872
PCT Pub. Date: Mar. 17, 2016

(65) Prior Publication Data
US 2017/0254528 A1    Sep. 7, 2017

(30) Foreign Application Priority Data

Sep. 9, 2014 (EP) .................................... 14184012

(51) Int. Cl.
*F21V 33/00* (2006.01)
*F21L 4/02* (2006.01)
(Continued)

(52) U.S. Cl.
CPC ............ *F21V 33/0076* (2013.01); *A62B 3/00* (2013.01); *B05B 7/1481* (2013.01); *B65D 83/60* (2013.01);
(Continued)

(58) Field of Classification Search
CPC .. F21V 33/0076; F21V 23/02; F21V 23/0414; F21V 33/00; F21L 13/00;
(Continued)

(56) References Cited

U.S. PATENT DOCUMENTS 4,401,050 A    8/1983    Britt et al.
4,714,914 A    12/1987   Boe
(Continued)

FOREIGN PATENT DOCUMENTS

EP    0692834 B1    3/1998
EP    2077815 B1    9/2013
(Continued)

OTHER PUBLICATIONS

F. Sammoura, et al., "Water-Activated Disposable and Long shelf Life Microbatteries", Sciencedirect.com, Science and Actuators A 111 (2007), pp. 79-86.
(Continued)

*Primary Examiner* — Elmito Breval
*Assistant Examiner* — Naomi M Wolford
(74) *Attorney, Agent, or Firm* — Akarsh P. Belagodu (57) ABSTRACT

The invention provides a water-activatable luminescent particulate material (1) comprising particles (100), wherein each particle (100) comprises a solid state light source (10) functionally coupled with a water-activatable battery (20) and a water absorbing shell (120) enclosing at least part of the water-activatable battery (20). The invention also provides a luminescent particulate material spray device com-
(Continued)

prising a container configured to host the water-activatable luminescent particulate material.

14 Claims, 5 Drawing Sheets

(51) Int. Cl.

| | |
|---|---|
| *F21V 23/04* | (2006.01) |
| *F21V 23/02* | (2006.01) |
| *A62B 3/00* | (2006.01) |
| *B65D 83/60* | (2006.01) |
| *B65D 83/14* | (2006.01) |
| *B05B 7/14* | (2006.01) |
| *F21Y 115/10* | (2016.01) |
| *F21W 111/00* | (2006.01) |

(52) U.S. Cl.
CPC .............. *B65D 83/752* (2013.01); *F21L 4/02* (2013.01); *F21V 23/02* (2013.01); *F21V 23/0414* (2013.01); *F21W 2111/00* (2013.01); *F21Y 2115/10* (2016.08)

(58) Field of Classification Search
CPC .......... H01M 6/34; A62B 3/00; B05B 7/1481; B65D 83/60; B65D 83/752; F21W 2111/00
USPC ........................................................ 362/101
See application file for complete search history.

(56) References Cited

U.S. PATENT DOCUMENTS

| | | | |
|---|---|---|---|
| 4,910,104 A | 3/1990 | Rao et al. | |
| 5,903,212 A | 5/1999 | Rodgers | |
| 6,816,064 B1 | 11/2004 | Ruiz | |
| 8,337,040 B1 | 12/2012 | Easley | |
| 2013/0335949 A1 | 12/2013 | Kao | |

FOREIGN PATENT DOCUMENTS

| | | |
|---|---|---|
| GB | 1437233 A | 5/1976 |
| WO | WO8903498 A2 | 4/1989 |
| WO | WO2006009404 A1 | 1/2006 |

OTHER PUBLICATIONS

R.F. Koontz, et al., "Magnesium Water-Activated Batteries", Chapter 17, www.knovel.com, McGraw-Hill, 2002, pp. 1-27.

PARTICULATE WATER-ACTIVATABLE LUMINESCENT MATERIALS

CROSS-REFERENCE TO PRIOR APPLICATIONS

This application is the U.S. National Phase application under 35 U.S.C. § 371 of International Application No. PCT/EP2015/069779, filed on Aug. 28, 2015, which claims the benefit of European Patent Application No. 14184012.4, filed on Sep. 9, 2014. These applications are hereby incorporated by reference herein.

FIELD OF THE INVENTION

The invention relates to a water-activatable lighting system. The invention further relates to a spray device including such water-activatable system. The invention also relates to specific uses of such system.

BACKGROUND OF THE INVENTION

The use of luminescent materials for e.g. safety applications is known in the art. U.S. Pat. No. 4,401,050, for instance, describes a phosphorescent escape route indicator having at least one protruding indicia formed within or attached to a sheet of material. The protruding indicia have incorporated therewith a phosphorescent substance capable of emitting a glow in the absence of light. An adhesive formed as part of the sheet is utilized to apply the indicator to the surface of walls or stairways thereby aiding in delineating escape routes or access routes to emergency equipment during time of emergency.

SUMMARY OF THE INVENTION

A problem with prior art systems that can be used for emergency lighting is that these systems are often static. Further, often such systems need daylight to be charged, such as in the case of phosphorescent materials, and cannot light up when desired. Of course, a torch can be used, but such a torch is in general only useful for the person carrying the torch.

Hence, it is an aspect of the invention to provide an alternative lighting system that can e.g. be used in emergency situations, which preferably further at least partly obviate one or more of above-described drawbacks. For instance, it is especially desirable to provide a system to guide people to an exit (for instance to evacuate people) or to a place of emergency (for instance for emergency workers) that can be used in any circumstance where there is no light and wherein e.g. normal routes may be blocked and alternative routes have to be used.

The present invention proposes mini-LED modules that are lit by water, i.e. water-activatable, and that can be distributed over a large surface or can be used to provide a marking at a desired place or to mark a safe track ("safety line"). At this moment there are no (very) small autonomous LED modules that start to light-up when activated by water and remain working autonomously for certain time. Modules that are available have a separate battery and are of large size (e.g. life jacket lights). The integration of the (water activated) battery into the LED package will allow shrinking the module size significantly up to the point that it is compatible with spray and coating techniques. This opens opportunities for a series of new applications.

In the present invention, in a specific embodiment a power source (primary battery functionality) is integrated into a LED package, allowing very small module size and autonomous functionality. Hence, a (small) water activated battery can be used, which is powered on by exposing to water. The invention provides LED micro-modules with an electrical design such that a minimal number of components are required (direct powering/current supply to the LED from the wet battery function), leading to very small LED modules, operating autonomously for even about a few hours after activation with water. The solid state light source may optionally include a LED laser, such as a vertical-cavity surface-emitting laser, or VCSEL.

Hence, in a first aspect the invention provides a water-activatable luminescent particulate material (herein also indicated as "LED particles" or "LED grains") comprising particles ("grains" or "beads"), wherein each particle comprises a solid state light source functionally coupled with a water-activatable battery and each particle comprises a water absorbing shell enclosing at least part of the water-activatable battery. Hence, the combination of (small) water-activatable batteries functionally coupled to (small) solid state light sources, especially having dimensions equal to or smaller than 5 mm, are provided as particles that can e.g. be sprayed or otherwise distributed over an area to lit up such an area (after activation of the batteries).

In yet a further aspect, the invention provides a luminescent particulate material spray device comprising (i) a container configured to host the water-activatable luminescent particulate material as defined herein, (ii) a spray opening to provide a spray of luminescent particulate material, and (iii) one or more of (iiia) a fluid to propel the luminescent particulate material via the spray opening out of the spray device and (iiib) an inlet for such fluid.

In yet another aspect, the invention also provides such a container per se, i.e. a container enclosing the water-activatable luminescent particulate material as defined herein. Further, optionally the spray device comprises a detachable container. With this embodiment, an empty container can be replaced with a filled container, which can be attached to the spray device. Hence, the spray device may include a replaceable container for functionally replacing the container with luminescent particulate material.

Hereby, the luminescent particulate material or the spray device can e.g. be used in an emergency situation, like in the case of fire, flooding of building areas, on water surfaces, etc. The particulate material, i.e. the particles, can be spread over an area and by activation with water, before or after applying the particulate material to an area, the particles give (LED) light. For instance, they can (also) be used to find or mark an object, human or animal in a situation of reduced daylight. For example, a marking can be made from a safe area to a location where a human or animal is in need of help or may be in need of help. Emergency workers can find their way back. In an embodiment, the luminescent particulate material or the spray device is used to mark a route in a building. However, the luminescent particulate material may also be distributed over an area, such as a relatively large area, and may optionally also be distributed by a suitable flying object such as for example a drone. In yet another embodiment, the luminescent particulate material may be used to mark an object to warn people for such an object, like a broken vehicle on a road or highway. For instance, with the spray device, one may mark a car when the car is broken on a place and at a moment of low light level, like a remote road or a road (part) during night without lighting. The invention is not limited to emergency situation applications. Also other applications may be included, such as during use of e.g. a festival or other situations wherein, without any emergency situation, a lighting effect may be created. However, from an environmental point of view, especially situations are targeted at wherein other suitable means may be less effective, such as in emergency situations as e.g. described herein.

Water-activatable batteries are known in the art. For instance, batteries can be used with a first battery electrode comprising magnesium (metal) and a second battery electrode comprises one or more of AgCl, CuCl, $PbCl_2$, $Cu_2I_2$, $CuSCN$ and $MnO_2$, in an embodiment one or more of AgCl and CuCl, especially one of the afore mentioned (six, especially two) compounds. When layers of such materials are functionally coupled to a solid state light source, the light source can provide light when such layers are also in contact with water because then these layers provide an activated battery that delivers power, i.e. current or voltage, to the light source (i.e. the water-activatable aspect of the device).

As known, solid state light source include p-n junction diodes. Hence, in a specific embodiment one or more particles comprise a stack, the stack comprising a p-n junction diode, with a p-type part electrically connected to a first battery electrode and with the n-type part electrically connected to a second battery electrode, wherein the first battery electrode comprises magnesium and wherein the second battery electrode comprises one or more of AgCl, CuCl, $PbCl_2$, $Cu_2I_2$, CuSCN and $MnO_2$. However, optionally particles may be provided wherein the battery and diode do not form a stack, but are arranged separate from each other on a substrate. When electrically connecting (i.e. functionally connecting) the solid state light source and the battery layers, a functional module can be provided. In yet another embodiment, the water activatable battery comprises a cathode manufactured largely from an oxy-halogen material and an anode of aluminum, magnesium, zinc or alloys thereof. Especially, the oxy-halogen material may be selected from the group comprising trichlorotriazinetrione and 1,3-dibromo-5,5-dimethylhydantoin.

Hence, the solid state light source or LED and the battery are especially integrated on a single substrate, and are even more especially integrated in a single stack of layers. This may lead to very small modules, as LEDs can be made very small. Presently, LEDs are available having die dimensions in the order of 200*200 $\mu m^2$. In general, each particle includes a single solid state light source. Further, each particle will include one or more (water-activatable) batteries.

Such small assemblies of (water-activatable) battery and (solid state) light source may especially be at least partly, or even entirely, be enclosed by a shell. Such a shell may be used to protect the assembly and/or may be used to store water in embodiments where the shell also covers the electrodes of the battery. Alternatively or additionally, the shell may be used to provide buoyancy to the particles. Hence, the invention provides in embodiments particles wherein the entire assembly is enclosed by a shell, and wherein the electrodes of the battery are thus also enclosed by the shell, or wherein part of the assembly is enclosed by a shell, and wherein e.g. (part of) the electrodes may protrude the shell. The term "shell" refers to a material at least partially enclosing a core. Here, the core may at least include the assembly of the battery and LED. In a specific embodiment, the particles, especially the shells thereof, are configured to provide floatable particles, i.e. particles that float on water, especially during at least 10 minutes, even more especially at least 30 minutes, yet even more especially at least an hour, such as two or more hours.

The shell may comprise a light transmissive material and/or the shell may include a water absorbing material. In the latter embodiment, water may be harvested by the shell upon contact with water, and may be used to power the battery. Optionally, the shell may also include electrolyte material. Of course, the shell may include a material that has one or more of the above indicated functionalities and/or the shell may include a plurality of materials, each having one or more of the indicated functionalities. Further, the shell may include a plurality of materials, which may e.g. have one or more different functionalities. The term "light transmissive" especially relates to a (solid) material that transmits at least part of the visible light. Examples of polymers that can be light transmissive are indicated below.

As transmissive (polymeric) material especially one or more materials may be selected from the group consisting of e.g. PE (polyethylene), PP (polypropylene), PEN (polyethylene napthalate), PC (polycarbonate), polymethylacrylate (PMA), polymethyl-methacrylate (PMMA) (Plexiglas or Perspex), cellulose acetate butyrate (CAB), silicone, polyvinylchloride (PVC), polyethylene terephthalate (PET), (PETG) (glycol modified poly-ethylene terephthalate), PDMS (polydimethylsiloxane), and COC (cyclo olefin copolymer).

As water absorbing material, a water absorbing polymer, such as a super absorbing polymer, may be used. Super absorbent polymers (also called SAPs) are polymers that can absorb and retain extremely large amounts of a liquid relative to their own mass. Examples of water absorbing polymers are e.g. polyarcylamide and polyacrylate. Water absorbing polymers are known in the art, and are e.g. described in WO2013083698, and references cited therein. Water absorbing polymers are e.g. applied in diapers, and materials suitable for such an application may also be usable in the present invention. A specific example of a water absorbing material is a hygroscopy material. Hence, in a further embodiment the shell may include an hygroscopic material. Examples of hygroscopic materials are e.g. metal salts, though other materials may also be hygroscopic. Further examples of hygroscopic materials may include one or more of $ZnSO_4$, $CaCl_2$, $SiO_2$, $NaNO_3$, $CaSO_4$, etc. The hygroscopic material herein used is especially a material that is solid before contact with water. When hygroscopic salts are used, especially those salts have a medium solubility.

As electrolyte commonly known electrolytes may be used, such as one or more of sodium chloride, nitric acid, chloric acid, hydrochloridic acid, calcium chloride, potassium chloride, potassium nitrate, sodium hydroxide, sodium acetate, sulphurica acid, magnesium hydroxide, etc. Especially, the electrolyte is soluble in water and includes one or more of calcium, potassium, chloride, magnesium, sodium, hydroxide, and phosphate, even more especially an alkali metal and one or more of chloride and hydroxide, like NaCl, KCl, NaOH, KOH, etc. Especially, the shell at least includes the absorber, as this allows an autonomous powering of the LEDs (after activation with water), whereas without such an adsorbent the application may be confined to applications on water or in humid environments.

Hence, in an embodiment each particle comprises a shell, especially a water absorbing shell, enclosing at least part of the water-activatable battery. In yet a further each particle comprises a shell, especially a water absorbing shell, enclosing at least part of the water-activatable battery and at least part of the solid state light source. Especially, in the latter embodiment the shell may be transmissive for light of the solid state light source. Hence, in an embodiment the stack as defined herein may at least partially be enclosed by a shell, especially a water absorbing and/or light transmissive shell.

The phrase "water-activatable luminescent particulate material comprising particles" indicates that the particulate material at least comprises the luminescent particles as described herein. However, this phrase does not exclude the presence of other type of particles (or optionally even non-particulate material).

Optionally, the shell comprises a material having pores (accessible to water). Water may enter the pores and activate the particles to provide luminescence.

As indicated above, in a specific variant the electronic part of the particles may essentially consist of a stack of a p-n junction with the above indicated electrodes at both sides of the junction. Note that the term "p-n junction" may in embodiments also include e.g. multiple junction including systems, like p-n-p-n junctions, etc.

To provide more power to the LED it may be desirable to use multiple batteries arranged in series. Alternatively or additionally, a joule-thieve or step-up converter may be used. Hence, in a further embodiment one or more particles comprise a plurality of water-activatable batteries arranged in series functionally coupled with the solid state light source, or wherein one or more particles comprise a step-up converter functionally coupled with the solid state light source and the water-activatable battery. In such embodiments, the battery and LED, and the optional step-up converter, may be arranged on a substrate. Here, the term "step-up converter" is used to a indicate boost converter, a joule thieve or other converters, which are known in the art and which can be used as DC-to-DC power converter with an output voltage greater than their input voltage.

With the invention small luminescent particles can be made with dimensions below the cm range, even below the mm range. Dependent upon the application, like in a spray or in a missile or other type of device, the desired dimensions may be chosen. For instance when using a spray with a propellant, relative small dimensions may be desired. Hence, in a specific embodiment the particles have dimensions selected from the range of 50 μm-50 mm, such as dimensions in the range of 200 μm-20 mm, such as 200 μm-10 mm, like 200 μm-5 mm, such as at least 500 μm. Within such dimension ranges efficient LEDs may be arranged that can be powered with the water-activatable batteries. Herein the phrase "have dimensions selected from the range of 50 μm-50 mm" and similar phrases indicate that the particles have lengths, widths, heights, or diameters in those ranges. In other words, particles can be enclosed in a cube of such dimensions. The particulate material may not necessarily be monodisperse. As coating technologies or molding technologies may be used to provide the shell, there may be some distribution in the dimensions. As indicated above, small dimensions in the sub-millimeter range may also be possible, and may especially be of interest for spray applications. Hence, in a further embodiment the particles have dimensions selected from the range of 100-500 μm. In yet a further embodiment, the particles have dimensions selected from the range of 200-1.5 mm, such as 500 μm-1.5 mm.

The term LED indicates light emitting diode. The light emitting diode may be configured to provide colored light, such as blue, green, yellow, orange or red light. Optionally, the luminescent particulate material comprises a mixture of particles which provide emissions with different spectral distributions. In this way, for instance white light may be generated with particles that provide blue light and particles that provide yellow light, or via the commonly known RGB principle. Optionally, the shell may include a wavelength converting material, able to convert at least part of the light source light into light of another wavelength. Also in this way for instance white light may be provided.

Optionally, spray devices (see also below) may be provided with different colors. One may for instance imagine that for emergency applications to mark an object a simple green monochromatic light or red monochromatic may be applied (comparable to low color rendering lighting at highways), whereas e.g. for indoor applications, like in demolished houses or multi-floor buildings where visibility and distinguishability (in fact color rendering) may also be relevant, white light may be more desirable.

As indicated above, the invention also provides a luminescent particulate material spray device comprising (i) a container configured to host the water-activatable luminescent particulate material as defined herein, (ii) a spray opening to provide a spray of luminescent particulate material, and (iii) one or more of (iiia) a fluid to propel the luminescent particulate material via the spray opening out of the spray device and (iiib) an inlet for such a fluid. Hence, especially two embodiments may be distinguished: a first embodiment wherein the spray device may be able to provide the spray without external propelling means, and a second embodiment wherein the spray device may be configured to use external propelling means to provide the spray.

In the former embodiment, a fluid under high pressure may be available in the spray device, optionally in a separate container within the spray device. In the latter embodiment, the spray device may for instance be arranged on a device that is configured to provide a spray itself. A bypass may be created to propel the particulate material or the entire stream of material from the device that is configured to provide the spray itself may be used. For instance, in an embodiment the spray device is configurable on a fire hose nozzle for use of at least part of the extinguishing material that is transported through the fire hose nozzle (during use of the fire hose) as fluid to propel the luminescent particulate material. Other applications may also be conceivable. In embodiments wherein a propellant may be comprised by the spray device, such propellant may e.g. be selected from the group consisting of a volatile hydrocarbon, such as typically propane, n-butane and isobutene, dimethyl ether (DME), methyl ethyl ether, nitrous oxide, carbon dioxide, hydrofluoroalkanes (HFA), such as HFA 134a (1,1,1,2,-tetrafluoroethane) or HFA 227 (1,1,1,2,3,3,3-heptafluoropropane), etc. Dependent upon the application, different types of propellant may be chosen. Especially in view of emergency situations where fire is a risk, relative inflammable propellants like nitrous oxide and/or carbon dioxide may be chosen (or the option with an external propellant, like a flow of water; see above).

As indicated above, when applying the material water may be available at the place of application. In such an embodiment the powering of the material may be done by this water. For instance, one may consider the application of particulate material on a sea or ocean to light up a saving action at a ship. However, not always water is available at the location where the water-activatable luminescent particulate material may have to be applied or is applied. Hence, to that end the spray device may optionally also include a water reservoir. Hence, in a further embodiment the spray device further comprises an aqueous liquid contained in the spray device separate from the water-activatable luminescent particulate material. The user may, before using the spray device, mix the aqueous liquid and the particulate material. Alternatively, the spray device is configured to mix the aqueous liquid and the particulate material when propelling the particulate material out of the nozzle of the spray device. The term "aqueous liquid" may especially refer to water, but may optionally also refer to a mixture of water and a propellant, such as one or more of the above indicated gasses.

In a specific embodiment of the spray device, the spray device comprises a first container and a second container, each configured to host the water-activatable luminescent particulate material, wherein a first water-activatable luminescent particulate material in said first container is configured to provide luminescence upon contact with water having a first spectral distribution, and wherein a second water-activatable luminescent particulate material in said second container is configured to provide luminescence upon contact with water having a second spectral distribution, wherein the spectral distributions differ, and wherein the spray device is configured to spray the water-activatable luminescent particulate material wherein during spraying the content of first water-activatable luminescent particulate material and second water-activatable luminescent particulate material in the spray varies over time. Such spray device may especially be used to provide a marking that has a color variation over its length. This may especially be of interest to guide a person in specific direction. Hence, the invention also provides the use (of the luminescent particulate material in an emergency situation) wherein a marking is provided with varying spectral distributions over the length of the marking, and wherein the marking is made to indicate a direction.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1:
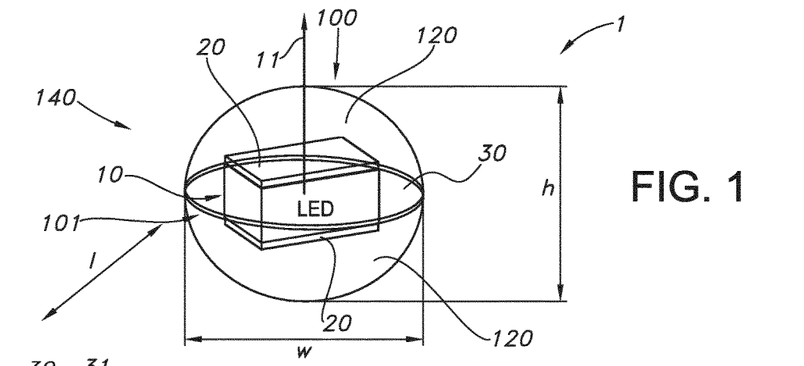
FIG. 1 schematically depicts a luminescent particulate material (showing only a single particle)

FIG. 1 schematically depicts an embodiment of a water-activatable luminescent particulate material 1 comprising particles 100, here an embodiment of a single particle 100 is schematically depicted. The particles 100 comprise a solid state light source 10, such as one or more of semiconductor light-emitting diodes (LEDs), organic light-emitting diodes (OLED), or polymer light-emitting diodes (PLED), especially a LED, functionally coupled with a water-activatable battery 20. The dimensions are indicated with height h, width w and length l. Especially, these dimensions do not deviate much from each other, such as not more than 25% of an average value. In this way, substantially round particles may be provided, though other shaped particles 100 may also be possible. Further, the particles 100 may especially include a shell material. The shell is indicated with reference 120. This may provide a substantially round shape to the particle 100. The shell may entirely surround the substrate or carrier, indicated with reference 30 comprising said battery 20 and light source 10 ("assembly"). Optionally, the electrodes of the battery may extend from the shell 120 and/or may not be covered by the shell 120. Especially the shell 120 or other material in contact with the (light emitting part of the) LED or p-n junction diode 101 may be transmissive for the light source light 11. In this way, downstream from the shell 120 light source light 11 may be perceived.

In FIG. 1, the shell is drawn to enclose also the electrodes. In such instance, the shell may be porous and/or water absorbing. Optionally or additionally, at least part of the electrodes may not be covered by the shell, and may come directly into contact with water when the particle 100 is exposed to water. The shell may include multiple layers (multishell).

Figure 2A:
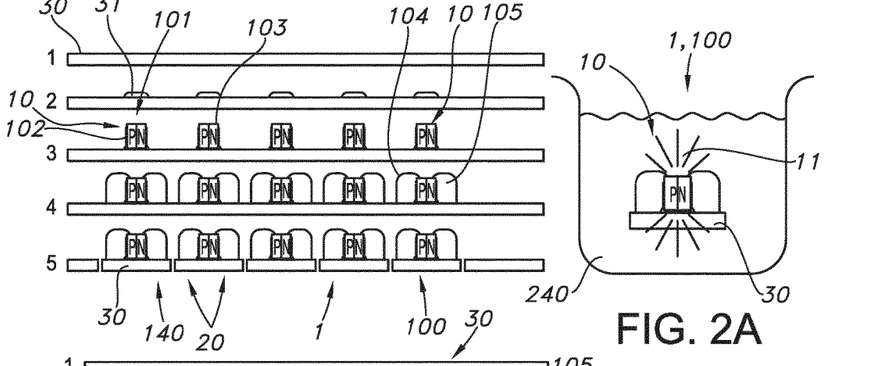
FIGS. 2a-2e schematically depict some embodiments and aspects to make such luminescent particulate material, as well as embodiments and aspects of the particulate luminescent material.

In an embodiment, as schematically depicted in FIG. 2a, the LED grain fabrication may start from as-is LED dies/crystals. In one approach these LED dies are re-distributed onto a temporary or permanent carrier 30, optionally using a glue or other adhesive material 31, in such a way that the anode and cathode are exposed (e.g. in the case of a, preferred, VTF (vertical thin film) LED die configuration, the LEDs are re-distributed 'side-ways'). In a next step, half-cell battery material is applied in the form of lines (e.g. by a printing technology), such that these anodes (Mg) and cathodes (Cu) are brought into contact with the LED electrodes. After a separation step (in x- and y-direction), individual LED dies are obtained, that can be powered by exposure to water. In this way a stack 140 is provided. If required these modules can be finished with a final encapsulation step (e.g. with the shaping of a sphere geometry) of a transparent material that adsorbs/holds water, i.e. the shell 120. After water activation this allows to continue powering the LED even in a dry atmosphere. This sphere can also be used for protecting/stabilizing the module prior to water-based activation. As shown in FIG. 2a, the stack, indicated with reference 140, comprising a p-n junction diode 101, with a p-type part 102 electrically connected to a first battery electrode 104 and with an n-type part 103 electrically connected to a second battery electrode 105, wherein the first battery electrode 104 comprises for instance magnesium and wherein the second battery electrode 105 comprises for instance one or more of AgCl, CuCl, $PbCl_2$, $Cu_2I_2$, CuSCN and $MnO_2$. When put in an aqueous liquid 240, such as water, the battery the LED 10 is powered (activated) and provides power to the light source 11 which thus provides light. Here, for the sake of clarity no shell 120 is depicted, but this shell may optionally be present. Optionally, such a shell 120 may include a luminescent wavelength converting material for converting the light source light 11. Further, as indicated above the shell 120 is especially water absorbing.

Figure 2B:
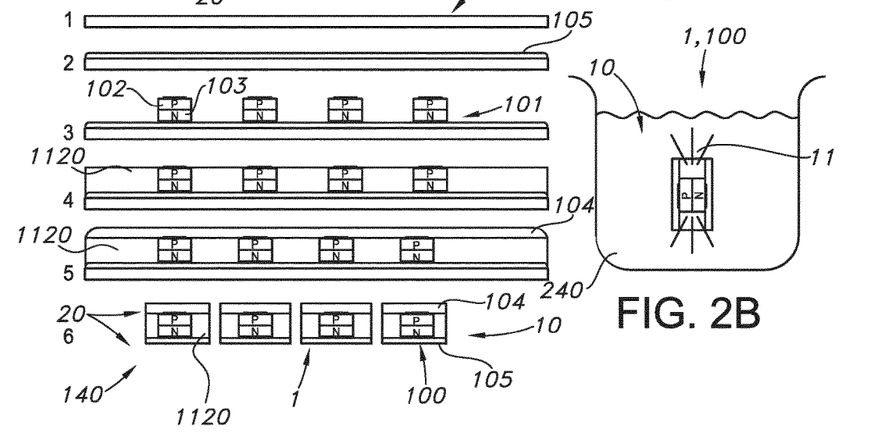

In an alternative embodiment, schematically depicted in FIG. 2b, substrate level processing is envisaged. The process starts from as-is LEDs. In a first process step these LEDs are placed anode (or cathode) down onto a temporary carrier that is pre-coated with one of the battery electrodes (e.g. Cu or Mg). In a next step, the stack is covered and planarized with a layer 1120, especially a permeable layer, also as to allow physical separating the two battery electrodes. Finally a top layer with the other battery electrode (e.g. Mg or Cu) is applied, resulting in functionalized LEDs. Potentially, also finishing and protection layers can be applied. Finally the stacks are separated into individual powered LED grains, and these can be taken off the temporary carrier for further use. The (permeable) layer 1120 may comprise an water absorbing material as described above. Further, the (permeable) layer 1120 is especially transmissive for the light source light. Again, when the luminescent particulate material 1 is put in an aqueous liquid 240, such as water, due to the battery the LED 10 is powered and provides light source light 11.

Figure 2C:
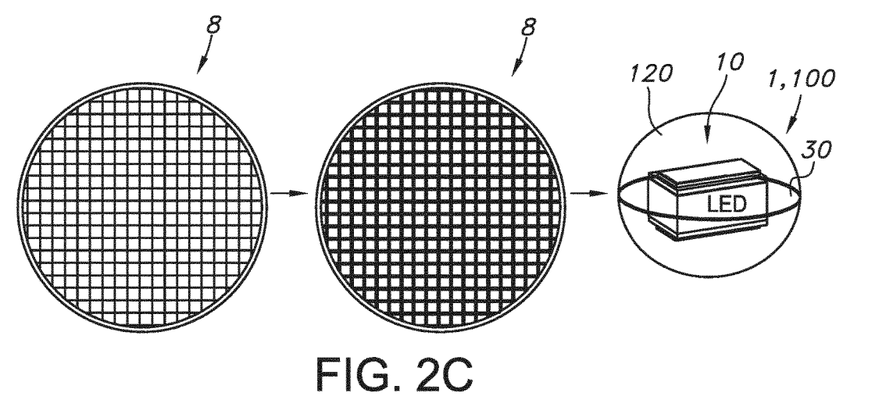

In a further embodiment, schematically depicted in FIG. 2c, which embodiment can be combined with the embodiments of FIG. 2a or 2b, for LED package fabrication wafer level packaging technology may be used to allow low cost LED packages. The electrodes for the water activated battery can be formed in a massive parallel way on wafer level. The (high level) process consists of following process modules:

1. Start from an as-is LED wafer (out of the line);
2. Wafer level post process (e.g. to apply battery electrodes);
3. Moulding techniques to encapsulate with water absorptive material.

Potentially, in a later phase, the as-is wafer designs may be adapted in order to create specific electrode configurations either to: 1) ease the wafer level post processing requirements or 2) build a series battery configuration to increase battery power. It is also clear that two-sided wafer processing is required, and that suitable coating and separation technologies will have to be explored and developed. Additional, the size of battery is limited (x,y sizes are directly linked to the 'on-wafer' sizes).

Figure 2D:
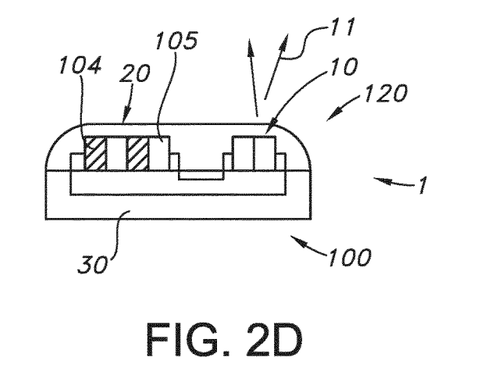
Figure 2E:
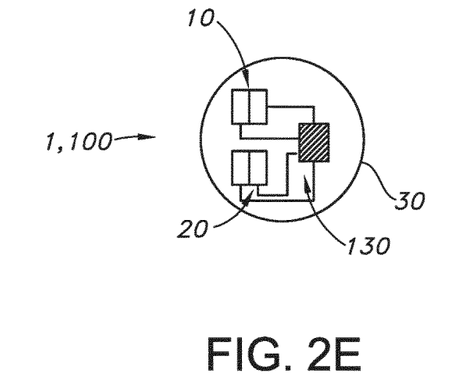

FIGS. 2d and 2e schematically depict particles (for the sake of clarity not shown including an optional shell 120) comprising a plurality of water-activatable batteries 20 arranged in series functionally coupled with the solid state light source 10, see FIG. 2d, or wherein particles 100 comprise a step-up converter 130 functionally coupled with the solid state light source 10 and the water-activatable battery 20, see FIG. 2e. In both cases, a higher voltage may be provided to the LED light source 10, which may be desirable. Other arrangements of stacks of batteries may also be possible.

Figure 4A:
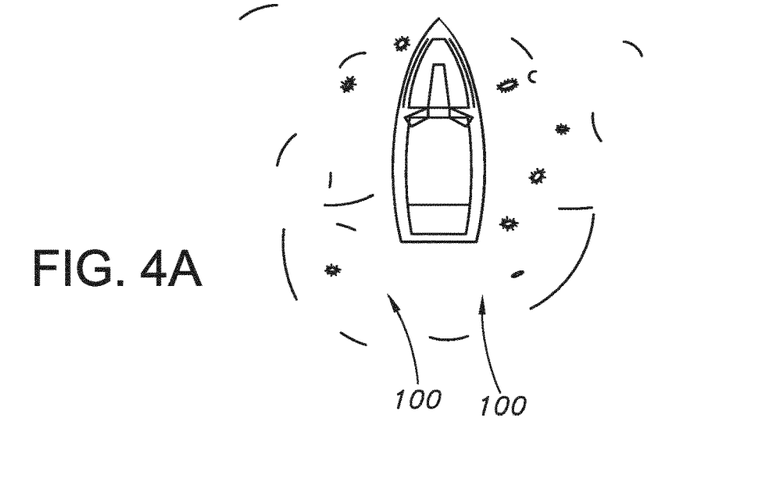
FIGS. 4a-4c schematically depicts some application embodiments.
Figure 4B:
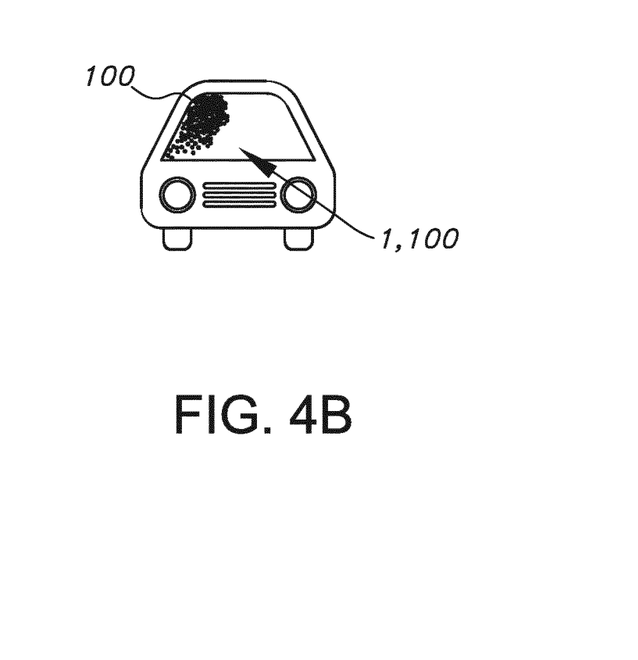
Figure 4C:
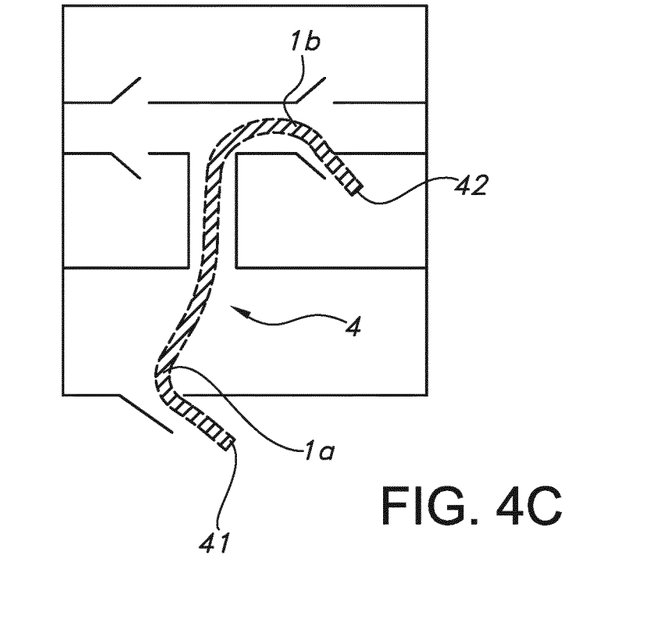

Application of such LED grains can be in the field of spraying or coating LEDs where only limited operation time is required. One can think of a light emitting sprayed line in an emergency situation as building fire (where firemen will paint the route back/out of the building) or car breakdown (to lighten-up and marking the location of the car at dark areas), see illustrations (4a-4c).

Figure 3A:
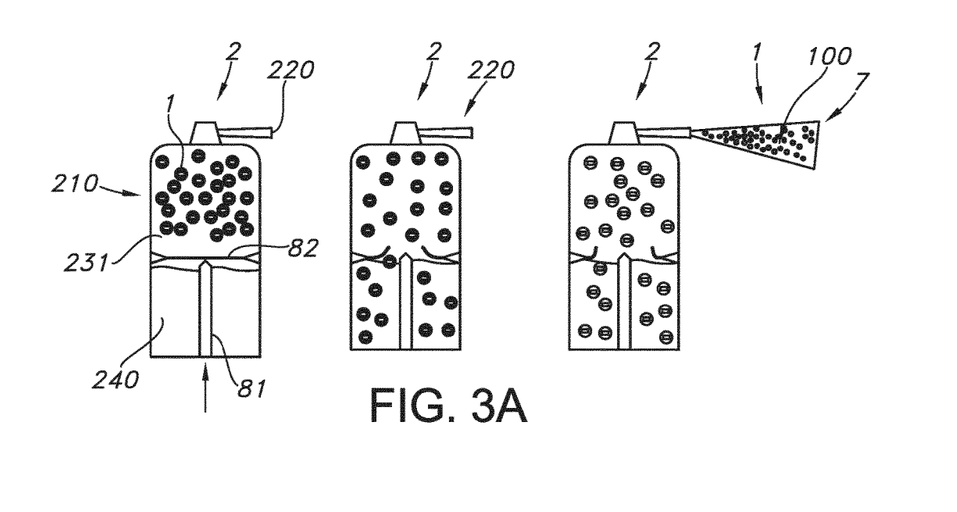
FIGS. 3a-3c schematically depict some embodiments and aspects of a spray device.

Activation and ignition of the light grains can be done by exposing them to water, either spraying dry grain into water or exposing to water prior to spraying. The last situation is illustrated in e.g. FIG. 3a below. FIG. 3a schematically depicts an embodiment of a luminescent particulate material spray device 2 comprising (i) a container 210 configured to host the water-activatable luminescent particulate material 1 as defined above, (ii) a spray opening 220 to provide a spray 7 of luminescent particulate material 1, and (iii) a fluid 231 to propel the luminescent particulate material 1 via the spray opening 220 out of the spray device 2. The fluid 231 may be a gas or a liquid and is in this embodiment schematically shown to be in the same chamber or container 210 as the particulate luminescent material 1. However, optionally the fluid 231 may be in another chamber. By way of example, the embodiment of FIG. 3a further comprises an aqueous liquid 240, such as water, contained in the spray device 2 separate from the water-activatable luminescent particulate material 1. For instance by pushing an element 81 through a separator 82, the luminescent particulate material 1 gets into contact with the aqueous liquid 240.

Figure 3B:
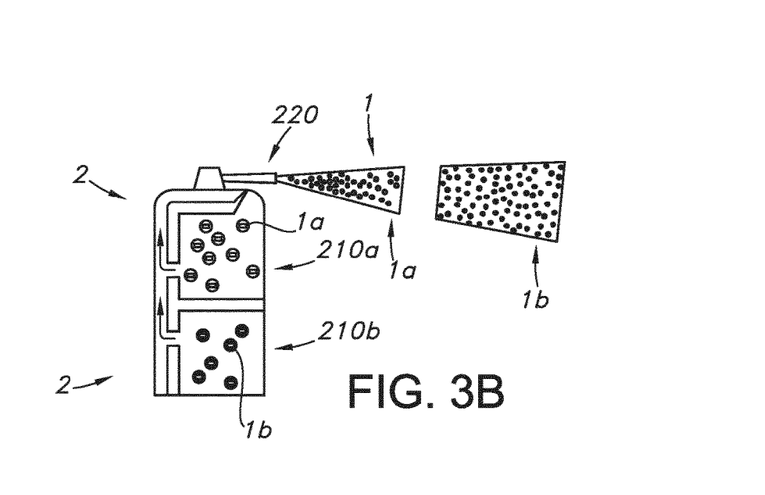

FIG. 3b schematically depicts an embodiment wherein the spray device 2 comprises a first container 210a and a second container 210b, each configured to host the water-activatable luminescent particulate material 1, wherein a first water-activatable luminescent particulate material 1a in said first container 210a is configured to provide luminescence upon contact with water having a first spectral distribution, and wherein a second water-activatable luminescent particulate material 1b in said second container 210b is configured to provide luminescence upon contact with water having a second spectral distribution, wherein the spectral distributions differ. The terms "second container 210b" and "second water-activatable luminescent particulate material 1b" and similar terms, may also related to more than 1 of such elements, thus optionally also a third container and a third water-activatable luminescent particulate material, all having different spectral distributions. In this way, during spraying the content of first water-activatable luminescent particulate material 1a and second water-activatable luminescent particulate material 1b in the spray (7) varies over time, which is very schematically depicted in FIG. 3b. Hence, a marking can be provided with a color change over the length.

Figure 3C:
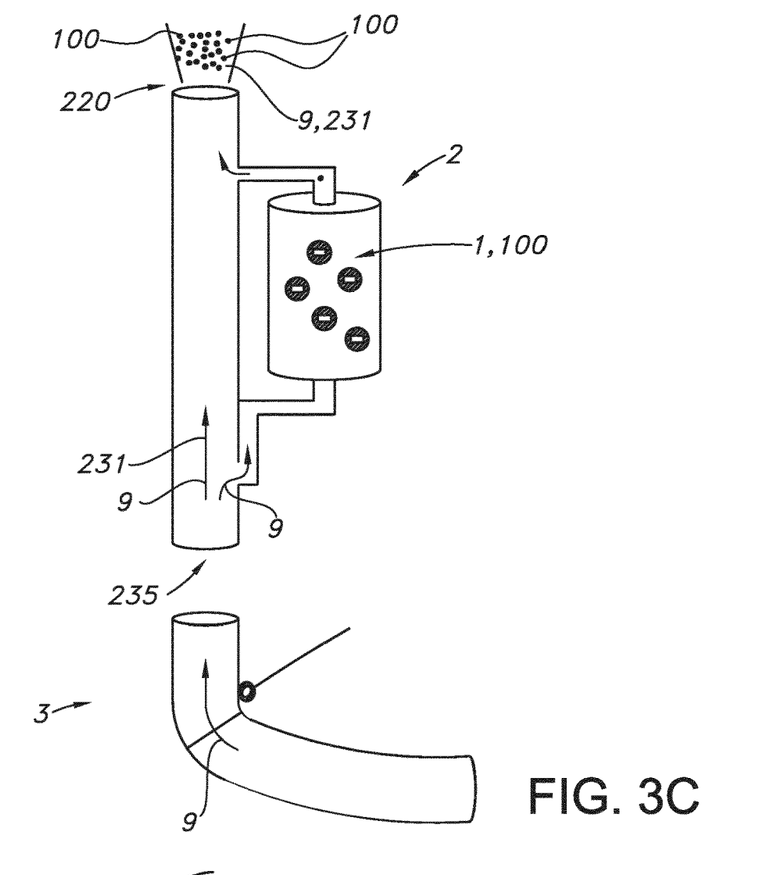

In yet another embodiment, which is schematically depicted in FIG. 3c, the spray device 2 is configurable on e.g. a source of a liquid or gas flow, such as a fire hose nozzle 3 for use of at least part of the extinguishing material 9 that is transported through the fire hose nozzle 3 during use of the fire hose as fluid 231 to propel the luminescent particulate material 1. Especially, when the extinguishing material comprises water, the luminescent material is also activated. The spray device 2 in this embodiment comprises an inlet 235 for such a fluid 231.

FIG. 4a very schematically depicts a vessel on water in an emergency situation. When providing a plurality of luminescent particles 100, such as from a helicopter, the vessel can be marked and lit up for emergency workers.

FIG. 4b very schematically depicts a vehicle in an emergency situation. By spraying luminescent particulate material 100 on the car, other road users may be warned.

FIG. 4c very schematically shows a marking 4, starting e.g. at position 41 and ending at an emergency position or exit 42. The color of the luminescent particulate material light 11 may vary over the length. Such a marking 4 may e.g. be provided with the spray device of FIG. 3b.

The invention claimed is:

1. A water-activatable luminescent particulate material comprising particles, wherein each particle comprises a solid state light source functionally coupled with a water-activatable battery, and a water absorbing shell enclosing at least part of the water-activatable battery.

2. The water-activatable luminescent particulate material according to claim 1, wherein the shell is light transmissive.

3. The water-activatable luminescent particulate material according to claim 1, wherein one or more particles comprise a plurality of water-activatable batteries arranged in series functionally coupled with the solid state light source, or wherein one or more particles comprise a step-up converter functionally coupled with the solid state light source and the water-activatable battery.

4. The water-activatable luminescent particulate material according to claim 1, wherein the particles have dimensions selected from the range of 50 µm-50 mm.

5. The water-activatable luminescent particulate material according to claim 1, wherein the particles have dimensions selected from the range of 100-500 µm.

6. The water-activatable luminescent particulate material according to claim 1, wherein one or more particles comprise a stack, the stack comprising a p-n junction diode, with a p-type part electrically connected to a first battery electrode and with the n-type part electrically connected to a second battery electrode, wherein the first battery electrode comprises magnesium and wherein the second battery electrode comprises one or more of $AgCl$, $CuCl$, $PbCl_2$, $Cu_2I_2$, $CuSCN$ and $MnO_2$.

7. A luminescent particulate material spray device comprising a container configured to host the water-activatable luminescent particulate material as defined in claim 1, a spray opening to provide a spray of luminescent particulate material, and one or more of a fluid to propel the luminescent particulate material via the spray opening out of the spray device and an inlet for such fluid.

8. The spray device according to claim 7, further comprising an aqueous liquid contained in the spray device separately from the water-activatable luminescent particulate material.

9. The spray device according to claim 7, wherein the spray device is configurable on a fire hose nozzle for use of at least part of the extinguishing material that is transported through the fire hose nozzle during use of the fire hose as fluid to propel the luminescent particulate material.

10. The spray device according to claim 7, comprising a first container and a second container, each configured to host the water-activatable luminescent particulate material, wherein a first water-activatable luminescent particulate material in said first container is configured to provide luminescence upon contact with water having a first spectral distribution, and wherein a second water-activatable luminescent particulate material in said second container is configured to provide luminescence upon contact with water having a second spectral distribution, wherein the spectral distributions differ, and wherein the spray device is configured to spray the water-activatable luminescent particulate material wherein during spraying the content of first water-activatable luminescent particulate material and second water-activatable luminescent particulate material in the spray varies over time.

11. Use of the luminescent particulate material according to claim 1 or the spray device in an emergency situation.

12. The use according to claim 11, to find or mark an object, human or animal in a situation of reduced daylight.

13. The use according to claim 11, to mark a route in a building.

14. The use according to claim 13, wherein a marking is provided with varying spectral distributions over the length of the marking, and wherein the marking is made to indicate a direction.

* * * * *